3,261,744
PESTICIDAL PREPARATIONS
Fritz Bachmann, Riehen, Switzerland, assignor to Ciba Limited, Basel, Switzerland, a company of Switzerland
No Drawing. Filed July 8, 1965, Ser. No. 470,558
Claims priority, application Switzerland, July 22, 1964, 9,639/64
4 Claims. (Cl. 167—30)

The present invention provides preparations for combating harmful organisms, especially harmful insects, acarids, nematodes and gastropodes, which preparations comprise as active principle, a mixture of
(a) A compound of the general formula

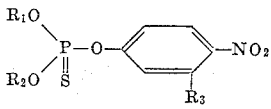

in which $R_1$, $R_2$ and $R_3$ each represents a low alkyl radical, preferably a methyl radical, and
(b) a compound of the general formula

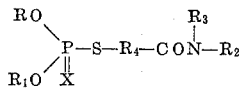

in which R and $R_1$ each represents a low alkyl radical that may be substituted by chlorine atoms, or a cyclohexyl, benzyl, phenyl or tetrahydrofurfuryl radical, $R_2$ represents a low alkyl radical interrupted by at least one oxygen atom or a phenoxyethyl radical, $R_3$ represents a hydrogen atom or a low alkyl radical or the same radical as $R_2$, $R_4$ represents the group $-CH_2-$, $$-CH_2-CH_2-\text{ or }-CH-R_5$$
$$\phantom{-CH_2-CH_2-\text{ or }-}R_5$$

$R_5$ representing a low alkyl radical and X represents an oxygen atom or a sulphur atom.

Preparations of the kind defined that are especially effective are those in which component (a) is a compound of the formula

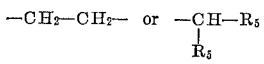

and component (b) is a compound of the formula

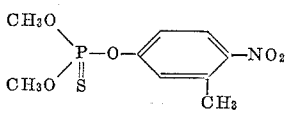

The quantitative ratio in which the two components (a) and (b) are present can vary within comparatively wide limits. It has been found to be especially advantageous if the ratio of (a) to (b) is within the range of from 3:1 to 1:3, preferably 1:1.

The new preparations are especially suitable for combating harmful insects and acarids. They can be used, for example, for protecting plants, materials and stored goods, general sanitary purposes and veterinary purposes.

The preparations of the invention are especially suitable for use as contact and stomach poisons.

In the field of plant protection, the preparations of the invention can be used, for example, for combating pests that cause damage to fruit and vegetables by eating and sucking, and they can also be used for combating cotton pests.

It is particularly surprising that the effect produced by a mixture of the components (a) and (b), for example, on insects and acarids, is substantially greater than the sum of the effects of each agent acting alone. It is thus evident that synergism occures when components (a) and (b) are admixed. By using the mixtures of the invention instead of the single components (a) and (b) it is possible to reduce substantially the amount of active principle required to kill the pests; furthermore, the mixtures have a surprisingly rapid action and show very good persistency. A further advantage of the mixtures of the invention in comparison with the components (a) and (b) acting alone is that they have a broader spectrum of effectiveness, for example, sucking insects such as the green apple leaf louse (*Aphis pomi*) or the red fruit tree mite (*Panonychus ulmi*) are much more effectively combated by the new preparations than when the same amount of the single component (b) is used, and the new preparations have a much more powerful action as stomach and contact poisons on leaf-eating caterpillars than the same amounts of the single component (a). It is surprising in the case of the new preparations that the combined amounts of the active principles (a) and (b) required are not greater than the amounts in which the components (a) and (b) are used singly.

Accordingly, the mixtures of components (a) and (b) as provided in this specification compensate for the deficiencies of the single components (a) and (b) without the necessity of increasing the amount of active principle used—a measure which was to be expected.

When used for combating insects and acarids the new preparations are effective at all stages of the creatures' development, that is to say, they act on eggs, larvae and imagines.

A very wide variety of substances can be protected from pests, for example, insects and acarids. Examples of substances or bodies to be protected or that may serve as supports are liquids, for example, water in ponds, objects of any kind in inhabited rooms, cellars, attics, stables, cowsheds, and the like, furs, feathers, wool, and the like, as well as living organisms of the plant and animal kingdoms in their various stages of development.

Combating of the pests is carried out by the usual methods, for example, by treating the bodies to be protected with the compounds in the form of dusting or spraying preparations, for example, in the form of solutions or suspensions prepared with water or suitable organic solvents, for example, alcohol, petroleum or tar distillates. Good results are also achieved with aerosols.

The spraying and dusting preparations may contain the usual inert fillers, for example, kaolin or bentonite or further additives, for example, sulphite cellulose waste liquor, cellulose derivatives, and the like, and they may also contain the usual wetting agents and adhesives to improve their wetting power and adhesion.

The following examples illustrate the invention. Unless otherwise stated, the parts and percentages are by weight.

EXAMPLE 1

Spraying concentrates having the compositions (a), (b) and (c) were prepared.

(a)

30 parts of the compound of the formula

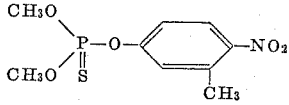

60 parts of xylene,
10 parts of an emulsifier comprising a mixture of the calcium or magnesium salt of mono-laurylbenzene-mono-sulfonic acid and a polyethylene glycol ether of the mono-lauryl ester of sorbic acid.

(b)

30 parts of the compound of the formula

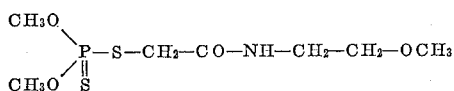

30 parts of cyclohexanone
30 parts of ethylene glycol monoethyl ether acetate
10 parts of the emulsifier described under (a).

(c)

15 parts of the active principle indicated under (a).
15 parts of the active principle indicated under (b).
60 parts of xylene
10 parts of the emulsifier described under (a).

The above spray concentrates were bulked to the desired concentration with water and stable emulsions were obtained.

EXAMPLE 2

Combating Clysia ambiguella (caterpillar attacking vines)

Vines infested with Clysia ambiguella were treated with sprays (a), (b) and (c) described in Example 1 at a time when a proportion of the caterpillars had emerged, the rate of application being 25 liters per 100 square meters per spray. Assessment was made after 12 days. The results are given in the following table:

| Spray | Concentration of active principle in spray, percent | Effect, percent |
| --- | --- | --- |
| (a) | 0.025 | 80 |
| (b) | 0.025 | 60 |
| (c) (mixture according to invention) | 0.025 | 100 |

It can be seen from the above table that the mixture (c) of the single active principles (a) and (b) is 100% effective against the pests concerned when used in the same concentration as the single active principles. It was expected that a combination of one half each of the concentrations of the single components (a) and (b) would produce a total effect of 70%. It is thus evident that synergism occurs when components (a) and (b) are admixed. It is especially important that a 100% effect is obtained when the mixture (c) is used.

It must be borne in mind that a satisfactory commercial product must have an effectiveness of at least 98% against Clysia ambiguella. This target is either not possible to achieve when using components (a) and (b) singly or it can be achieved only when substantially higher concentrations are used.

The mixture (c) of the single components (a) and (b) as described in the foregoing also displays similar superiority over the action of the components (a) and (b) when the latter are used singly when it is used against the following pests:

*Pegomyia hyoscyami betae*
*Acrolepia assectella*.

What is claimed is:

1. A preparation for combating pests which comprises as active principle a pesticidal amount of a mixture of
   (a) a compound of the formula

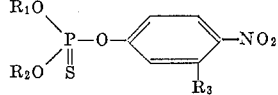

wherein $R_1$, $R_2$ and $R_3$ each represents lower alkyl, and
   (a) a compound of the formula

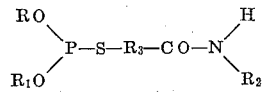

wherein R and $R_1$ each represents lower alkyl, $R_2$ represents lower alkoxyalkyl and $R_3$ represents lower alkylene, together with a carrier, the ratio of component (a) to component (b) being within the range of from 3:1 to 1:3.

2. An insecticidal and acaricidal preparation which comprises as active principle an insecticidal and acaricidal amount of a mixture of
   (a) the compound of the formula

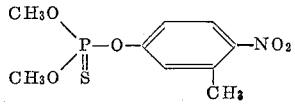

and (b) the compound of the formula

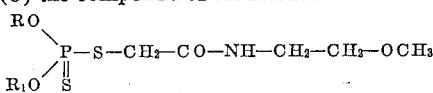

wherein R and $R_1$ each represent lower alkyl together with a carrier, the ratio of component (a) to component (b) being within the range of from 3:1 to 1:3.

3. The method for combating pests wherein there is applied to the area where the said effect is desired, a pesticidal amount of the mixture set forth in claim 1.

4. The method for combating insects and acarids wherein there is applied to the area where the said effect is desired, an insecticidal and acaricidal amount of the mixture set forth in claim 2.

References Cited by the Examiner

UNITED STATES PATENTS 3,004,055  10/1961  Perini _____ 167—22
3,091,565   5/1963  Suzuki _____ 167—30

JULIAN S. LEVITT, *Primary Examiner.*

S. J. FRIEDMAN, *Assistant Examiner.*

UNITED STATES PATENT OFFICE
CERTIFICATE OF CORRECTION

Patent No. 3,261,744　　　　　　　　　　　　　　　　July 19, 1966

Fritz Bachmann

It is hereby certified that error appears in the above numbered patent requiring correction and that the said Letters Patent should read as corrected below.

Column 4, lines 18 to 21, the left-hand portion of the formula should appear as shown below instead of as in the Patent:

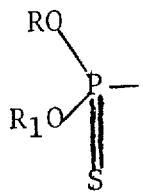

Signed and sealed this 1st day of August 1967.

(SEAL)
Attest:

EDWARD M. FLETCHER, JR.　　　　　　　　　　EDWARD J. BRENNER
Attesting Officer　　　　　　　　　　　　　Commissioner of Patents